March 16, 1971 R. A. BAKER 3,570,119

METHOD OF MAKING AN ENCAPSULATED COMPONENT

Filed Sept. 8, 1969

United States Patent Office 3,570,119

Patented Mar. 16, 1971

3,570,119
METHOD OF MAKING AN ENCAPSULATED COMPONENT

Ronald A. Baker, Williamstown, Mass., assignor to Sprague Electric Company, North Adams, Mass.

Continuation of application Ser. No. 614,836, Feb. 9, 1967. This application Sept. 8, 1969, Ser. No. 856,219
Int. Cl. H01f 7/06
U.S. Cl. 29—602 3 Claims

ABSTRACT OF THE DISCLOSURE

A cavity is provided at one end of a preform of insulative material and a plurality of terminal lead-wires are radially spaced from the cavity within the preform and extend alongside the cavity and from opposing ends of the preform. A component is disposed within the cavity in connection to the portions of the lead wires which extend from the cavity end of the preform, and insulative material is disposed over the component and connections and is sealed to the cavity end of the preform.

This application is a continuation of application Ser. No. 614,836 filed Feb. 9, 1967, now abandoned.

BACKGROUND OF THE INVENTION

The present invention relates generally to an encapsulated component and more particularly to a molded unit having long terminal lead-wire seals.

In the prior art, efficient protection of various components, such as capacitors, has necessitated the use of metal containers and glass-to-metal seals and the like to insure a satisfactory enclosure, however, this type of construction is generally expensive and often is not suitable to mass production techniques. On the other hand, the use of insulative coatings, such as organic polymers, as an encapsulation is more economical but generally does not offer adequate insurance against penetration of moisture, or the egress of electrolyte.

This disadvantage is due in part to the dissimilarity between the encapsulating materials and the termination wires which provide an inadequate seal not capable of withstanding the mechanical and thermal stresses which occur during connection and operation of the encapsulated component in the circuit.

The inadequate seal arises, in part, from a difference in expansion coefficients of the materials utilized in the encapsulated unit, and is further aggravated by the expansion coefficients of materials encountered in mounting the device in a circuit. In these circumstances, the seal between the encapsulant and the leads deteriorates and the useful life of the device is shortened. The short length of the terminal lead-wires of prior art construction also exposes the enclosed connections and the component to the thermal stresses which occur during circuit connection of the unit. One solution to these difficulties is to increase the sealing length of the terminal lead wire, however, this generally provides a component of objectionable length and limits its use in modern electronics .

SUMMARY OF THE INVENTION

Broadly, an encapsulated electrical unit is provided in accordance with the invention by: a molded preform of insulative material which includes a cavity at one end and a plurality of terminal lead-wires which are disposed alongside and radially spaced from the cavity and extended from opposing ends of the preform; an electrical component is disposed within the cavity in connection to portions of the lead-wires which extend from the cavity end of the preform; and insulative material is disposed over the component, the connections and the lead-wire portions and is sealed to the cavity end of the preform so as to provide an economical compact unit having a long seal between the lead wires and the encapsulating material.

Briefly, the method of constructing an encapsulated component in accordance with the invention comprises the steps of forming a body of insulating material having a plurality of lead-wires positioned around and radially spaced from a cavity therein and extending from opposing ends of the body, inserting a component in the cavity, connecting the component at the exposed end thereof to the adjacent lead-wires and encapsulating the exposed end of said component and the adjacent leads.

DESCRIPTION OF THE PREFERRED EMBODIMENTS

Figure 1:
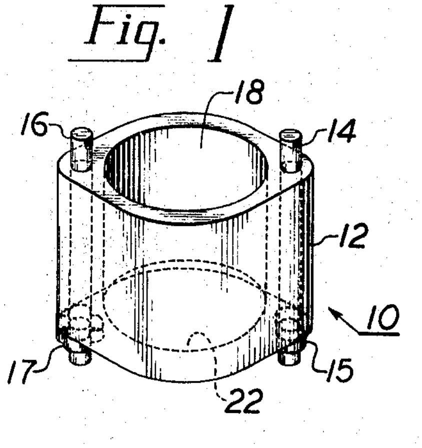
FIG. 1 is a view in perspective of a molded preform designed to receive a component.

In FIG. 1, a pre-molded casing or preform 10 having a generally elliptical cross section is shown. The casing body, which may be any organic polymer material such as polypropylene, polyethylene, or the like, is molded or otherwise formed to enclose a pair of extended terminal lead-wires 14, 16 and a recess or cavity 18. The cavity, which is designed to fit the perimeter of the component to be encapsulated, is disposed at one end of the body 12, with leads 14 and 16 axially aligned with and radially spaced from the cavity and extended from opposing ends of body 12.

Figure 2:
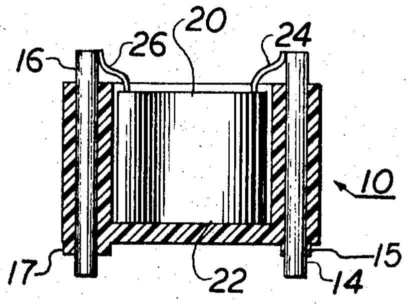
FIG. 2 is a view partly in section of the preform of FIG. 1 including its component.

In FIG. 2, a component 20, whose external configuration is approximately that of cavity 18, is positioned within and seated on the bottom 22 of cavity 18. Component tabs 24 and 26, which extend from the exposed end of the component, are connected to termination wires 14 and 16 adjacent the open end of cavity 18.

In this arrangement these connections are generally made without contamination of the lead wires 14, 16 or tabs 24, 26. For example, since the component is assembled into an upright cavity 18 there is far less likelihood of creepage of component solutions, such as electrolyte, or the like, along tabs 24 and 26. Furthermore, the portions of lead-wires 14, 16 which extend from body 12 at the cavity end are free of contamination by the encapsulation material, since this is applied in this area only after the connection is made.

Figure 3:
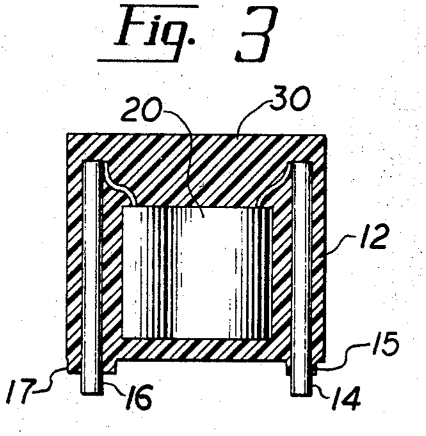
FIG. 3 is a view partly in section illustrating a complete encapsulation of the component of FIG. 2 in accordance with the invention.

Once the component has been placed within the cavity and connection made to the leads, a cap or cover 30 of insulating material is molded over the top of body 12 so as to completely enclose component 20, as shown in FIG. 3. Preferably, the cap is made of material similar to that of the body 12 and is joined or sealed to it so as to form a coalescence with it and a unitary construction, which completely encases the component.

As indicated, cap 30 may be molded directly on the subassembly of FIG. 2, or may be preformed before joining to the body. In either case a cohesive seal to body 12 may be formed so as to provide a complete enclosure of the component and its leads.

The forming or molding of cap 30 directly on the preform 10 is preferred rather than the joining of a preformed cap to the body, since the former will allow material to flow into any remaining crevices between the component 20 and cavity 18 and also seals off the component from the lead-wires and the connections. Thus, the connections and the lead-wires will be protected from any electrolyte creepage, or other harmful component materials.

This construction then provides a long sealing path for the terminals 14 and 16 which are radially spaced from the component within the encapsulation and which extend from the tab connections at one end of the component to beyond the other end before they project from the encapsulation. Thus the seal, between the insulative coating and the leads, exceeds the length of the component while resulting in little, if any, addition to the overall length. Generally, in the preferred embodiment the leads will extend directly from the tab connection in spaced parallel relationship to the axis of the cavity and its component, however, a more devious path may be employed where a still greater lead sealing path is desirable.

Consequently, the long sealing path of the leads makes the structure less susceptible to deterioration from the mechanical and thermal stresses of handling, circuit connection and operation of the encapsulated unit. In this regard any damage of the seal, from these sources, will be generally confined to an area adjacent the lead exit.

This construction also provides very accurate positioning of the terminal wires where they project from the encapsulation. This makes the unit suitable for various circuit connections, including those where accurate lead position is mandatory; such as for printed circuit board use. Furthermore, the position of the leads around the outside of the component, near the extremities of the base perimeter, also provides increased stability to the unit and a more rugged circuit arrangement without the use of supplementary anchoring devices.

In this embodiment, preform 10 also carries raised indicia 15 and 17 around leads 14 and 16 respectively, where they exit from the bottom of the body. The raised portions 15 and 17 not only operate as polarization markings (in this case + and −) but also as mounting feet, since they space the body from the circuit board, or chassis. This provides clearance which is desirable for cleaning or flushing of the circuit board to remove flux or other contaminants. Various types of raised indicia can be utilized in this way.

The raised portions 15, 17 also reduce the mechanical stress of the lead-wire seal which results from any bending of the leads 14 and 16 during handling, or connection in circuit, etc. In this regard, the raised indicia will give slightly when any external bending force is applied to the lead, so as to increase the bend radius and, at the same time, reduce the mechanical stress experienced by the main body portions of the lead-wire seal.

Many different ways of forming the desired unit are possible, of course. For example, tabs 24, 26 could be connected to termination leads 14, 16 and thereafter a complete molding of the encapsulation could be made. However, in such case there would be the usual difficulties of providing correct wall thickness within the structure, etc.

Accordingly, a pre-formed body is preferred. In this method the casing or body 12, as shown in FIG. 1, is formed around wires 14, 16 and includes a recess 18 which conforms to the outer diameter of the component to be encapsulated. The component is then placed within the perform and its tabs are connected to the leads adjacent the exposed end of the component. Thereafter, insulative material 30 is molded over the component, its tabs and the adjacent leads, and completes the encapsulated structure.

One advantage of this structure and process is that the use of a preform casing will reduce handling during encapsulation since all operations are completed at one end of the body and as indicated, the position of the lead-wires and the placing of the component in an upright molding reduces the contamination of the lead-wires and its connections.

In this structure it is generally preferable that the tabs extend from one end of the component, however, when the tabs are otherwise arranged, they may still be positioned within the cavity so as to connect to the leads adjacent its open end. For example, if a tab extends from the bottom end of the component it may be brought back alongside the component within the cavity so as to provide connections at one end as shown. In this case, insulation may be provided between the component and tab by any conventional means.

Advantageously, many different termination wires may be employed in accordance with the invention. The size and shape etc. will be determined to some extent by the size and ultimate circuit use of the component. For example, 16–22 gage wire, or nickel or the like, is suitable for many components, however, for low power unit smaller wire sizes may also be suitable. Both round and flat stock may be employed. In addition, the extended wire ends may be formed so as to provide for a particular means of connection. For example, the wire ends may be curled to provide anchoring for the connecting circuit leads or component tabs. The extended ends may also be formed in any of the conventional shapes utilized for terminals.

Advantageously, the indicated process is adaptable to mass production techniques. For example, the wires may be fed through a mold which determines the wire position and the external configuration of the casing. Thereafter a cavity forming plunger is inserted within the mold, and plastic material is injected or otherwise provided within the mold and allowed to set. The wires are then cut to leave extended portions at both ends, as shown in FIG. 1. Thereafter the preformed body 12 may be removed from the mold and the encapsulation completed by insertion of the component, etc. as previously indicated. Advantageously, the preform 10 and cap 30 may be provided by any of the conventional plastic techniques such as injection molding, compression molding and casting, etc.

In a more automated arrangement, the body may be left within its mold until the overall encapsulation is complete. In this case, only the recess forming plug is removed once the plastic has at least partially set. The component is then inserted and connected, and the cover molded or sealed in place without removal from the preform mold. This reduces handling and eliminates the lengthy cooling usually necessary to prevent distortion upon removal from the mold. In addition, the body may be held at an elevated temperature so as to improve the coalescence of cap and body.

The automated process may be easily provided in an economical indexing unit. In this, the preform is formed at a first station of the index table. The cavity forming plunger is then removed and the table indexed, with the body in its original mold, to a second position where the component is automatically inserted and its tabs connected to the lead-wires. Thereafter the table indexes a further position where the insulative cap is formed over the body, And finally the table is indexed to an eject position where the completed unit is automatically removed.

Many different configurations are possible, of course. For example, a structure having four leads may be provided, as in FIG. 4, by forming a body 40 having a generally rectangular cross section with a termination wire 42, 44, 46 and 48 at each corner. This unit is advantageous in that it is adaptable to various four terminal components, such as a pulse transformer, or multi-section capacitor, or the like.

Figure 4:
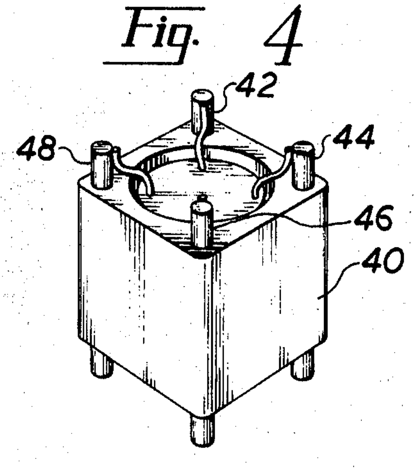
FIG. 4 is a view in perspective of an assembly of another pre-molded casing and a four terminal component.

Of course, the configuration of FIG. 4 could also be utilized for two or three terminal devices, in which case one or more leads would be connected to a common ground or not used.

Moreover, several components may be clustered together within the indicated recess 18 and connection made to the leads surrounding the cavity. Thus many different components and arrangements may be accommodated. In each case, the recess may closely conform to the component or group of them, as desired. Thus, the cavity may be any convenient shape and may accept one or more components.

In addition, many different forms or configurations of the encapsulated assembly may be provided. For example, the perimeter of the encapsulation may be circular, rectangular, elliptical or other shape such as pentagon, etc. In each case one or more terminating wires would be provided adjacent the perimeter, as shown, and extended along the length of the casing with connection made to the component within the encapsulation as previously indicated.

In some cases, it may also be desirable to utilize the encapsulating body to separately insulate different components. For example, as shown in FIG. 5, components 50, 52 and 54 are provided in each of three cavities 56, 58 and 60 of casing 62 in connection to appropriate lead 64, which are uniformly spaced around its perimeter.

Each component, which of course may be a capacitor, resistor, indicator, etc., is confined in this embodiment within its own recess and is adequately insulated from the other. The configuration, however, does decrease silghtly the volumetric efficiency of the encapsulated unit. In this regard, several components may be provided within a single recess (not shown) if each component is separately insulated, or where insulation between them is either unnecessary or otherwise undesirable.

Figure 5:
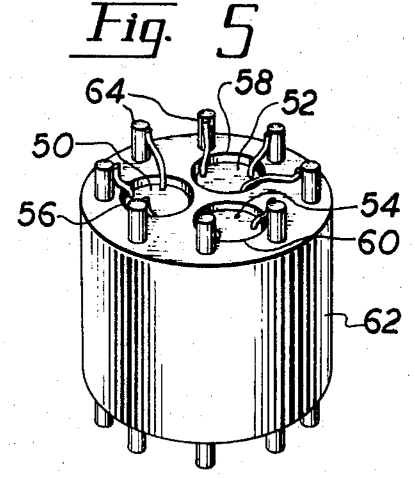
FIG. 5 is a view in perspective of an assembly of another preform and several components.

As shown in FIG. 5, the leads are provided adjacent the perimeter, however, a lead could be provided in the center, spaced equidistant from each cavity, or leads could be spaced around each of the individual cavities rather than grouped around the cluster as shown. Moreover, the cavities could be arranged in a side by side configuration with leads around the individual cavities or the group of them.

As indicated, various configurations are possible. For example, any regular geometrical cross section is useful and the concept shown in FIG. 4 in which a lead is positioned adjacent the intersection of planar surfaces, may be employed for other regular shapes, such as pentagon, hexagon, etc. as well as for irregular cross sections having intersecting planar surfaces.

Thus, it should be understood that many modifications are possible without departing from the spirit and scope of the invention and that it is not to be limited except as in the appended claims.

What I claim is:

1. A method of encapsulating an electrical component which comprises the steps of: forming within an external mold, a preformed body of plastic insulating material having a cavity therein at one substantially planar end thereof and a plurality of terminal lead-wires molded within said body for at least the length of said cavity, said lead-wires disposed within said body alongside and in radial spacing from said cavity and extended beyond both ends thereof, and the molded length of said lead-wires extended beyond the bottom of said cavity; retaining said preformed body in its external forming mold; maintaining an elevated temperature of said preformed body; inserting a component into said cavity; connecting said component to the ends of said lead-wires adjacent the exposed end of said component; and forming a covering of said plastic material while maintaining said preformed body at said elevated temperature in order that said covering be in intimate contact with and sealed to the cavity end of said body so as to encompass said component, said connections and said lead-wire ends and provide a complete encapsulation of said component.

2. The method of claim 1 wherein said step of forming a pre-formed body includes providing an external mold having a removable cavity forming plug therein, inserting wires into said mold, disposing plastic material within said mold, allowing said material to set, and removing said cavity plug.

3. The method of claim 2 wherein said wires are extended through said mold, and including the step of cutting said wires after positioning within said mold.

References Cited

UNITED STATES PATENTS

| | | | |
|---|---|---|---|
| 3,155,766 | 11/1964 | Eichert et al. | 174—52.6X |
| 3,246,272 | 4/1966 | Wiley | 336—96 |

JOHN F. CAMPBELL, Primary Examiner

C. E. HALL, Assistant Examiner

U.S. Cl. X.R.

29—627; 174—52.6; 264—272; 336—96